US009812933B2

(12) United States Patent
Feridouni et al.

(10) Patent No.: US 9,812,933 B2
(45) Date of Patent: Nov. 7, 2017

(54) ELECTRIC HAND TOOL HAVING A DISCRETE OPERATING ELEMENT

(71) Applicant: Robert Bosch GmbH, Stuttgart (DE)

(72) Inventors: Hamed Feridouni, Stuttgart (DE); Andreas Kynast, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 736 days.

(21) Appl. No.: 13/961,297

(22) Filed: Aug. 7, 2013

(65) Prior Publication Data

US 2014/0042838 A1   Feb. 13, 2014

(30) Foreign Application Priority Data

Aug. 8, 2012  (DE) .................. 10 2012 214 030

(51) Int. Cl.

| B25F 5/00 | (2006.01) |
|---|---|
| H02K 11/00 | (2016.01) |
| H01H 9/06 | (2006.01) |
| H02K 7/14 | (2006.01) |
| H02K 11/33 | (2016.01) |
| B25B 21/02 | (2006.01) |

(52) U.S. Cl.
CPC ............ *H02K 11/0073* (2013.01); *B25F 5/00* (2013.01); *H01H 9/061* (2013.01); *H01H 9/063* (2013.01); *H02K 7/145* (2013.01); *H02K 11/33* (2016.01); *B25B 21/02* (2013.01)

(58) Field of Classification Search
CPC .......... H01H 9/04; H01H 9/061; H01H 9/063; H01H 9/52; B25F 5/00; B25F 5/006; B25B 5/02; B25B 21/00; B25B 21/02; H02K 11/0063; H02K 11/0073; H02K 7/145
USPC ........ 173/217, 170, 171, 169, 29, 47, 162.2; 200/9, 43.17, 522; 318/139, 257, 503, 318/504; 388/937
See application file for complete search history.

(56) References Cited

U.S. PATENT DOCUMENTS

| 3,260,827 A | * | 7/1966 | Frenzel ................... B23B 45/02 |
|---|---|---|---|
| | | | 200/1 V |
| 3,376,402 A | * | 4/1968 | Bednarski .............. H01H 9/063 |
| | | | 200/1 V |
| 4,097,704 A | * | 6/1978 | Piber ...................... H01H 9/061 |
| | | | 200/1 V |
| 4,204,580 A | * | 5/1980 | Nalley ................... B25D 16/00 |
| | | | 173/170 |
| 4,588,910 A | * | 5/1986 | Bausch .................. H01H 9/063 |
| | | | 200/1 V |

(Continued)

FOREIGN PATENT DOCUMENTS

| DE | 197 56 857 C1 | 7/1999 |
|---|---|---|
| DE | 10 2008 003 287 | 7/2008 |

(Continued)

*Primary Examiner* — Scott A. Smith
(74) *Attorney, Agent, or Firm* — Norton Rose Fulbright US LLP; Gerard Messina

(57) ABSTRACT

An electric hand tool has an electric consumer, a movable operating element and a control unit for controlling a current flow between the energy store and the consumer on the basis of the position of the operating element. The control unit is constructed separately from the operating element and the mechanical position of the operating element is converted into an electrical control signal in the control unit.

15 Claims, 3 Drawing Sheets

(56) References Cited

U.S. PATENT DOCUMENTS

| | | | | |
|---|---|---|---|---|
| 4,665,290 A * | 5/1987 | Piber | H01H 9/061 | |
| | | | 200/303 | |
| 4,864,083 A * | 9/1989 | Bittel | H01H 9/063 | |
| | | | 200/1 V | |
| 5,198,793 A * | 3/1993 | Leveque | H05K 1/0284 | |
| | | | 200/522 | |
| 5,657,417 A * | 8/1997 | Di Troia | B25F 5/00 | |
| | | | 173/148 | |
| 5,892,885 A * | 4/1999 | Smith | H01H 9/061 | |
| | | | 318/139 | |
| 6,321,990 B1 * | 11/2001 | Giordano | G06K 7/10633 | |
| | | | 235/462.45 | |
| 6,489,578 B1 * | 12/2002 | Jung | H01H 9/063 | |
| | | | 200/1 V | |
| 7,210,542 B2 * | 5/2007 | Lam | H01H 3/20 | |
| | | | 173/171 | |
| 7,511,240 B2 * | 3/2009 | Inagaki | H01H 9/04 | |
| | | | 200/522 | |
| 7,705,260 B2 * | 4/2010 | Xu | H01H 1/5833 | |
| | | | 200/43.17 | |
| 8,446,120 B2 * | 5/2013 | Forster | B25F 5/00 | |
| | | | 318/503 | |
| 8,493,172 B2 * | 7/2013 | Pusateri | H01C 10/50 | |
| | | | 338/198 | |
| 8,716,962 B2 * | 5/2014 | Pusateri | B25F 5/00 | |
| | | | 318/257 | |
| 9,004,191 B2 * | 4/2015 | Muller | B25F 5/006 | |
| | | | 173/162.2 | |
| 2010/0314147 A1 * | 12/2010 | Muller | B25F 5/006 | |
| | | | 173/171 | |

FOREIGN PATENT DOCUMENTS

| | | |
|---|---|---|
| DE | 10 2008 063 113 | 7/2009 |
| EP | 2 431 135 | 3/2012 |
| WO | WO 2010/043244 | 4/2010 |

* cited by examiner

ELECTRIC HAND TOOL HAVING A DISCRETE OPERATING ELEMENT

FIELD OF THE INVENTION

The present invention relates to an electric hand tool having an operating element. In particular the present invention relates to an electric hand tool having an operating element for controlling an electrical function of the hand tool.

BACKGROUND INFORMATION

An electric hand tool, for example a drill or a screwdriver, has an electric motor to cause a tool holder of the hand tool to rotate. It is operated by one or more operating elements, one of which influences several functions of the hand tool under some circumstances. For example, a first operating element may control the direction of rotation of the electric motor or the tool holder, a second operating element may control the speed of rotation and a third operating element may control a torque limitation, which prevents the hand tool from delivering a torque higher than the predetermined torque via the tool holder.

Such an operating element usually includes a plurality of electrical and mechanical components which are configured primarily to trigger an electrical switching operation assigned to the operating element. In the case of the operating element which may be used for choosing the direction of rotation of the electric motor, for example, a two-way switch may be included for polarity reversal of the electric motor. The electrical switching operation is usually processed further via an electronic control unit.

Such operating elements may become rather complex, depending on the required design, the scope of function and the degree of integration, so that the development and manufacturing expense may also be quite high. The lifetime of a complex operating element may be short due to the great number of possible weaknesses. If the operating element has a high degree of integration or miniaturization, then repair of individual components is often impossible in the event of a defect.

SUMMARY

An object of the present invention is therefore to provide an electric hand tool, which includes an improved simple operating element.

An electric hand tool according to the present invention includes an electrical consumer, an operating element having a movable element for operation by a user and a control unit for controlling the current flow between the energy store and the consumer, based on the position of the movable element. The control unit is designed to be separate from the operating element, and the position of the movable element is converted into an electrical control signal in the control unit.

According to the present invention it is possible to structurally separate the operating function offered to the user from the electrical switch function, which controls the operating state of the hand tool. The movable element may be designed in this way to create haptic feedback to the user in an improved manner, so that the operability of the hand tool may also be improved without any visual or acoustic interaction.

In one specific embodiment, the movable element is configured to require a predetermined operating force for a change in its position. The force thus required is advantageously independent of the force required to generate corresponding electrical control signals.

To put it differently, the movable element may be designed completely for the haptic needs of the user with regard to its operating force without having to take into account electrical aspects or aspects of the conversion of a mechanical position into an electrical control signal or a mechanical behavior of an electrical component, in particular a switch. Conversely, the control unit, which scans the mechanical movement of the movable element and controls the current through the consumer on the basis of this scanning, may be dimensioned independently of the operating forces which are exerted by the user to move the operating element. For example, if only a miniature switch of a low or extremely low electric power is to be operated, it may be designed to be small and lightweight, but a mechanical mechanism which controls operating forces for the user on the movable element may be designed with larger dimensions independently thereof.

In a preferred specific embodiment, the operating element includes a locking mechanism, which is configured to counteract a movement of the movable element between predetermined positions.

Unintentional operation of the movable element may thus be made less likely. A corresponding function need not be implemented anew on the part of the control unit, so that a particularly simple and, if necessary, direct element for converting the position of the additional movable element into an electrical signal may be used at this point.

The locking mechanism may be configured to generate a predetermined noise mechanically with a movement of the movable element into one of the predetermined positions. This noise may be perceptible by the user acoustically or also haptically via structure-borne noise. Thus the haptic feedback from the movable element to the user may be further adapted to the needs of the user in a targeted manner without having to take into account the given situation of the hand tool and specifically of the control unit.

In one particularly preferred specific embodiment, the operating element includes another movable element for operation by a user, and the movability of the additional movable element is suppressed as long as the first movable element is in a predetermined position of the locking mechanism. A condition or position of the additional movable element may thus be locked. This condition may correspond in particular to a deactivated hand tool, so that inadvertent starting of the hand tool, for example, during shipping or during handling, may be prevented.

The additional movable element may have an electrical contact for supplying an electrical signal indicating its position. The function of the hand tool controlled by the additional movable element may require tactile feedback, which is simpler to handle. In particular the additional movable element may be similarly operable and may have a potentiometer for supplying an electrical signal.

The movable element may include connecting elements for form-fitting attachment of the additional movable element. The movable element and the additional movable element may thus be similarly operable and may have a potentiometer for supplying an electric signal.

The movable element may include connecting elements for form-fitting attachment of the additional movable element. The movable element and the additional movable element may thus be combined easily to form the operating element.

The movable element may be rotatable about an axis. The axis may easily be of such dimensions that even extremely high operating forces by the user are reliably absorbed without having to transfer these forces to the control unit.

In one particularly preferred specific embodiment, the consumer includes an electric motor, and the movable element is configured to control a direction of rotation of the electric motor. In this specific embodiment, haptic feedback, for example, in the form of a full jolt, stop or jump may be given during operation of the movable element, in particular without having to generate this feedback in combination with mechanical elements of the control unit.

In one specific embodiment, the movable element includes connecting elements for form-fitting attachment of the control unit. In a simple specific embodiment, the control unit may be implemented by one or multiple switches.

In one other specific embodiment, a more complex control unit, which allows a more differentiated analysis of the position of the movable element in particular, may be used. By separating the operating element from the control unit, corresponding operating elements may be used on different control units and, if necessary, on different hand tools, so that the haptic feedback to the user may remain the same over different variants of the device. Conversely, it is also possible as an alternative to equip a hand tool with different operating elements, for example, to take into account different market requirements with regard to different operating forces for users from different cultural groups.

DETAILED DESCRIPTION

Figure 1:
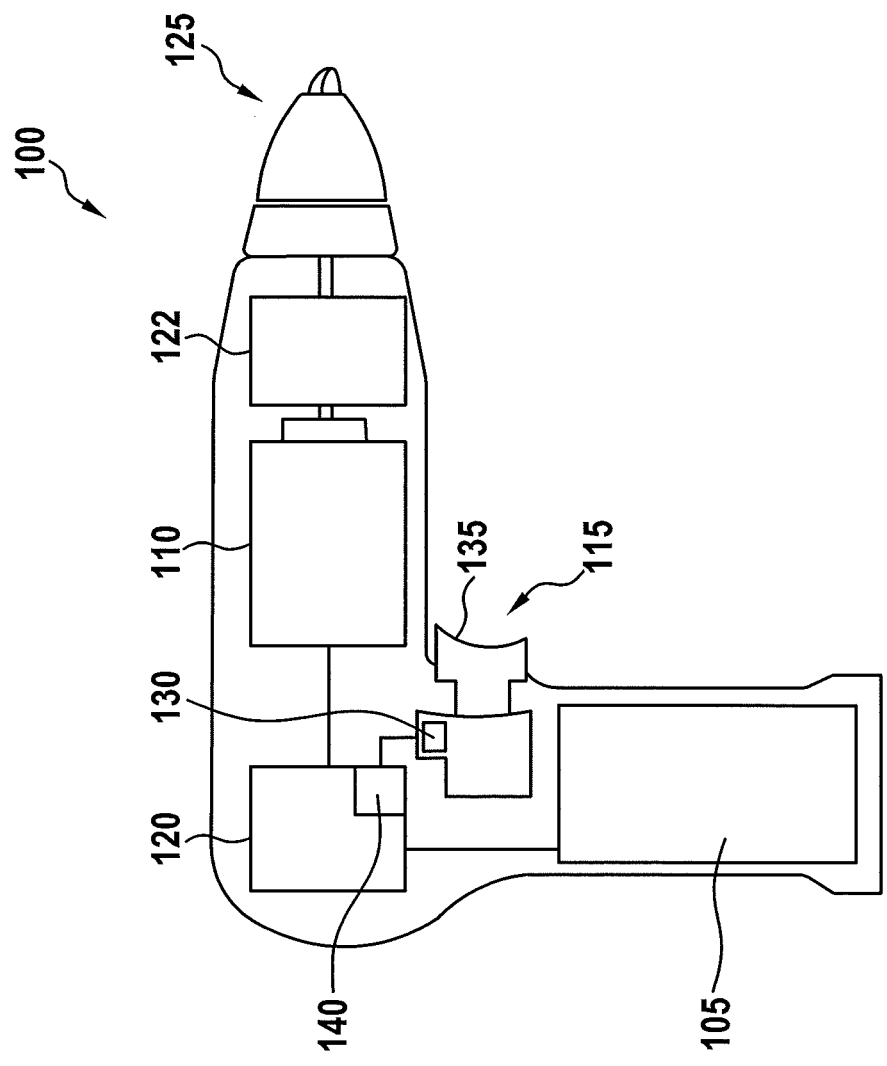
FIG. 1 shows an electric hand tool.

FIG. 1 shows an electric hand tool 100. Hand tool 100 includes an energy store 105, an electrical consumer 110, an operating element 115 and a control unit 120. The exemplary specific embodiment shown here may be a battery-operated drill or screwdriver in the case of electric hand tool 100. Consumer 110 has an electric motor connected via a gear 122 to a mechanical tool holder 125. Tool holder 125 is configured in particular for accommodating a drill, a milling tool or a screwdriver.

Operating element 115 has at least one first movable element 130. In the optional specific embodiment shown here a second movable element 135 is also provided. Operation of consumer 110 is controllable by control unit 120, which controls the current flow between energy store 105 and consumer 110. This control depends on the position of first movable element 130. The second movable element may be configured to control another function of hand tool 100.

First movable element 130 is movable by a user of hand tool 100. Movable element 130 may be displaceable along one direction of movement or may be rotatable or pivotable about an axis of movement. As explained in greater detail below, operating element 115 is preferably configured to enable the movement of the movable element 130 in such a way that actuation and resistance forces, actuation paths or noises associated with actuations are suitable for imparting haptic feedback and optionally also acoustic feedback about an operating procedure. The situation is similar for second movable element 135, elements 130 and 135 controlling different aspects of the current flow between energy store 105 and consumer 110 and which may be configured accordingly to deliver variable haptic feedback to a user. In the specific embodiment depicted here, first movable element 130 may control, for example, a direction of rotation of electric motor 110 and second movable element 135 may control the rotational speed of electric motor 110.

It is essential for control unit 120 to be constructed separately from operating element 115. This means that operating element 115 may be a fully mechanical component which does not have any directly scanned electrical properties such as a resistance or a switching function. Instead, the position or movement supplied by operating element 115 is converted into an electrical signal by control unit 120.

In a simple specific embodiment, control unit 120 may include only one switch, which may be operated by operating element 115.

In another specific embodiment, control unit 120 may include, for example, a differentiated electronic control unit, conversion of the mechanical position of operating element 115 into a control signal for triggering electronic modules of control unit 120 being carried out by a scanning unit 140 of control unit 120 provided specifically for this purpose. Scanning unit 140 may be, for example, a microswitch, a spring contact, a sliding switch, a reed contact, a Hall sensor, a photoelectric barrier or some other suitable device for scanning operating element 115.

In one specific embodiment, the electric elements for converting the position of second movable element 135 into an electrical signal or an electrically scannable property may also be included by operating element 115, in particular by second movable element 135.

Figure 2:
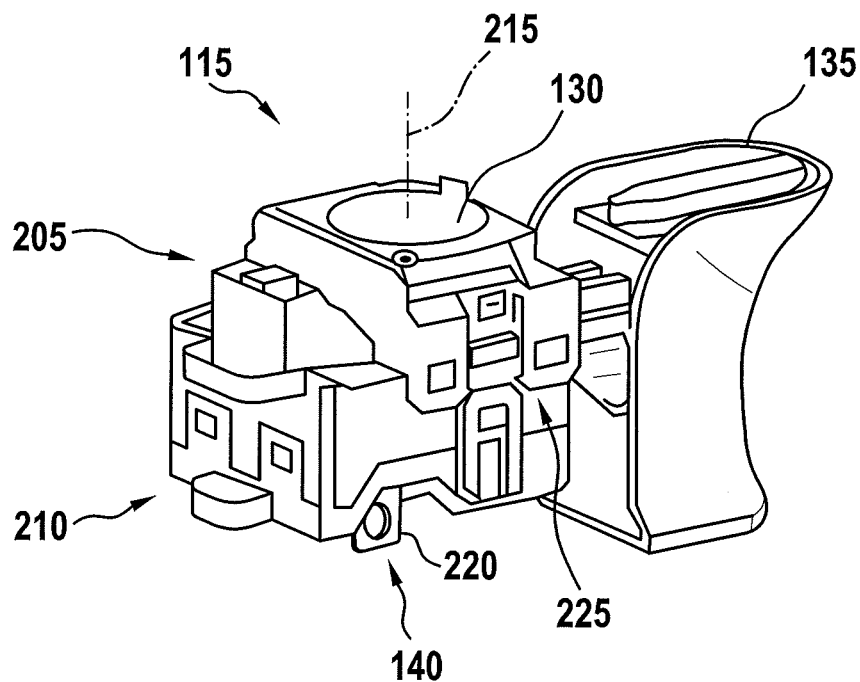
FIG. 2 shows an operating element for the hand tool from FIG. 1.

FIG. 2 shows operating element 115 for hand tool 100 from FIG. 1 in an exemplary specific embodiment. The diagram in FIG. 2 shows operating element 115, which may be assembled from a top section 205 and a bottom section 210, preferably using a locking connection, in particular a releasable locking connection. Top section 205 includes first movable element 130 and may also include a number of additional elements, which define or ensure movability of first element 130 in top section 205. Such elements may include in particular a spring, a spring-loaded ball, a lever or an axis. In the specific embodiment shown here, an axis of rotation 215 about which first element 130 is movable is provided.

Bottom section 210 includes second movable element 135 and optional elements for defining the movability of second element 135 and/or the movability characteristics. In the preferred specific embodiment shown here, a switch or potentiometer is additionally installed, an electrical terminal 220 being provided for electrical contacting of such components. For the operability of top section 205, bottom section 210 and in particular the presence of scanning device 140 are not necessary.

Top section 205 and bottom section 210 may preferably be brought together. In the specific embodiment shown here, a snap connection 225 is provided for this purpose.

Figure 3:
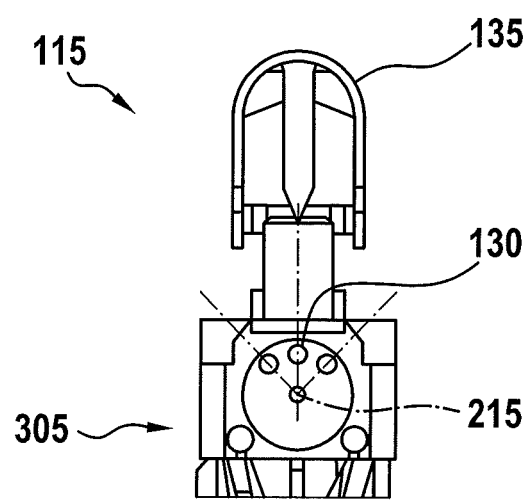
FIG. 3 shows the operating element from FIG. 2 in another perspective.

FIG. 3 shows operating element 115 from FIG. 2 in a perspective top view. In the specific embodiment shown here, a connecting element 305 is provided for connecting control unit 120 or its scanning unit 140 to operating element 115.

Figure 4:
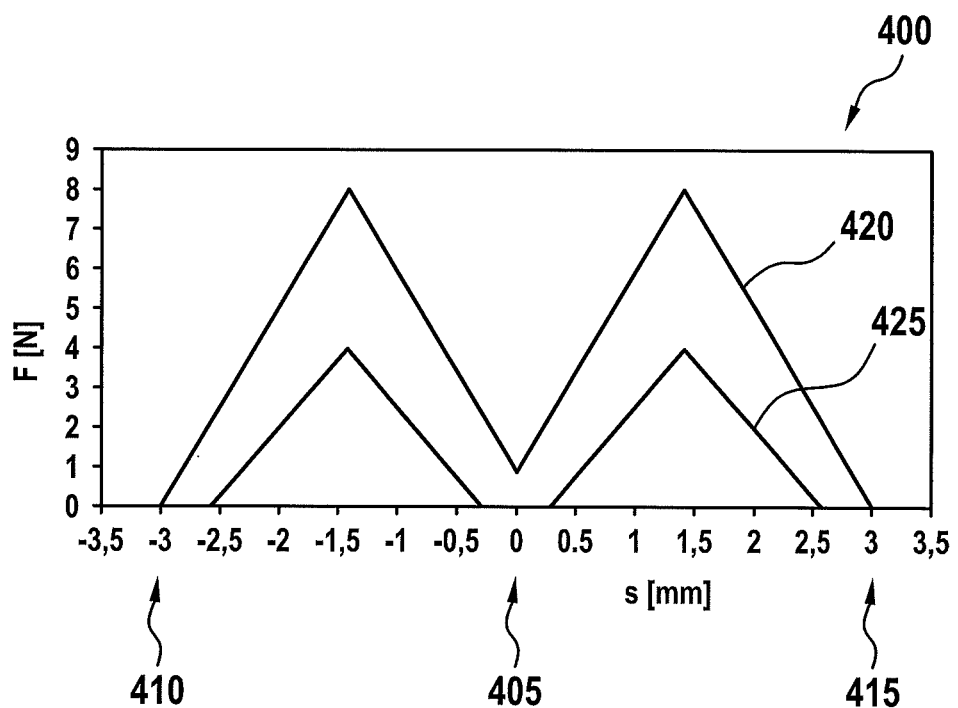
FIG. 4 shows a force-path diagram of the operating element of one of FIGS. 1 through 3.

FIG. 4 shows a force-path diagram 400 of operating element 115 of one of FIGS. 1 through 3. Diagram 400 relates to a peripheral path of first movable element 130 about its assigned axis of rotation 215. This path s is plotted horizontally, while the corresponding force is plotted vertically. The units given are merely examples.

At a path s of 0 mm, movable element 130 is in a middle position, where the movability of second element 135 may be prevented, limited or impeded mechanically. This position of first movable element 130 is therefore also known as locking position 405. In the −3 mm position, there is a running position 410 at the left, and at a position of +3 mm, there is a running position 415 at the right. Running positions 410, 415 correspond to the left and right direction of rotation, respectively, of electric motor 110 of exemplary hand tool 100 from FIG. 1.

A first curve 420 shows a relationship between path s and the force. A second curve 425 shows a maximal deviation from a first curve 420. It is apparent that first curve 420 is designed to be symmetrical with locking position 405 along path s. To go from locking position 405 to one of running positions 410, 415, an actuating force is exerted, increasing to 8 N in the present example with an increase in deflection from locking position 405. From there the operating force drops again, reaching approximately 0 N at the corresponding running position 410, 415.

What is claimed is:

1. An electric hand tool, comprising:
   an electrical consumer;
   an operating element having a first movable element for actuation by a user; and
   a control unit for controlling a current flow through the consumer on the basis of a position of the first movable element, wherein:
      the control unit is adapted to be separate from the operating element, and
      the position of the first movable element is converted into an electrical signal in the control unit but not in the operating element,
      wherein the first movable element is configured to require a predetermined operating force for a change in its position,
      wherein the operating element has a latching mechanism configured to counteract a movement of the first movable element between predetermined positions,
      wherein the predetermined operating force is independent from a force required to generate a corresponding electrical control signal.

2. The hand tool as recited in claim 1, wherein the latching mechanism is configured to mechanically generate a predetermined noise when there is movement of the first movable element into one of the predetermined positions.

3. The hand tool as recited in claim 2, wherein this noise is perceptible by a user acoustically or haptically via a structure-borne noise.

4. The hand tool as recited in claim 1, wherein:
   the operating element includes another movable element for operation by a user, and
   a movability of the other movable element is suppressed as long as the first movable element is in a predetermined position of the latching mechanism.

5. The hand tool as recited in claim 4, wherein the other movable element has an electrical contact for supplying an electrical signal indicating a position of the other movable element.

6. The hand tool as recited in claim 4, wherein the first movable element has connecting elements for a form-fitting attachment of the other movable element.

7. The hand tool as recited in claim 4, wherein a condition or a position of the additional movable element is locked.

8. The hand tool as recited in claim 1, wherein the first movable element is rotatable about an axis.

9. The hand tool as recited in claim 1, wherein:
   the consumer includes an electric motor, and
   the operating element is configured to control a direction of rotation of the electric motor.

10. The hand tool as recited in claim 1, wherein the first movable element includes connecting elements for form-fitting attachment of the control unit.

11. The hand tool as recited in claim 1, further comprising:
   a control unit configured for a differentiated analysis of the position of the first movable element.

12. The hand tool as recited in claim 1, wherein the first movable element can be moved to at least one position, in which the first movable element or any component coupled to the first movable element is not contacting a component of the control unit.

13. The hand tool as recited in claim 1, wherein the control unit has a microswitch, a spring contact, or a sliding switch provided to convert the mechanical position of the operating element into a control signal for triggering electronic modules of the control unit.

14. The hand tool as recited in claim 1, wherein the control unit has a reed contact or a Hall sensor provided to convert the mechanical position of the operating element into a control signal for triggering electronic modules of the control unit.

15. An electric hand tool, comprising:
   an electrical consumer;
   an operating element having a first movable element for actuation by a user; and
   a control unit for controlling a current flow through the consumer on the basis of a position of the first movable element, wherein:
      the control unit is adapted to be separate from the operating element, and
      the position of the first movable element is converted into an electrical signal in the control unit,
      wherein the first movable element is configured to require a predetermined operating force for a change in its position,
      wherein the first movable element is designed for a haptic feedback of a user regarding an operating force and without consideration of electrical activity or a conversion of a mechanical position into an electrical control signal or a mechanical behavior of an electrical component.

* * * * *